March 17, 1942.                E. A. ROCKWELL                2,276,418
APPARATUS FOR CONTROLLING THE APPLICATION OF POWER
Filed Nov. 19, 1938                  2 Sheets-Sheet 1

INVENTOR
Edward A. Rockwell
BY
Arthur Wright
ATTORNEY

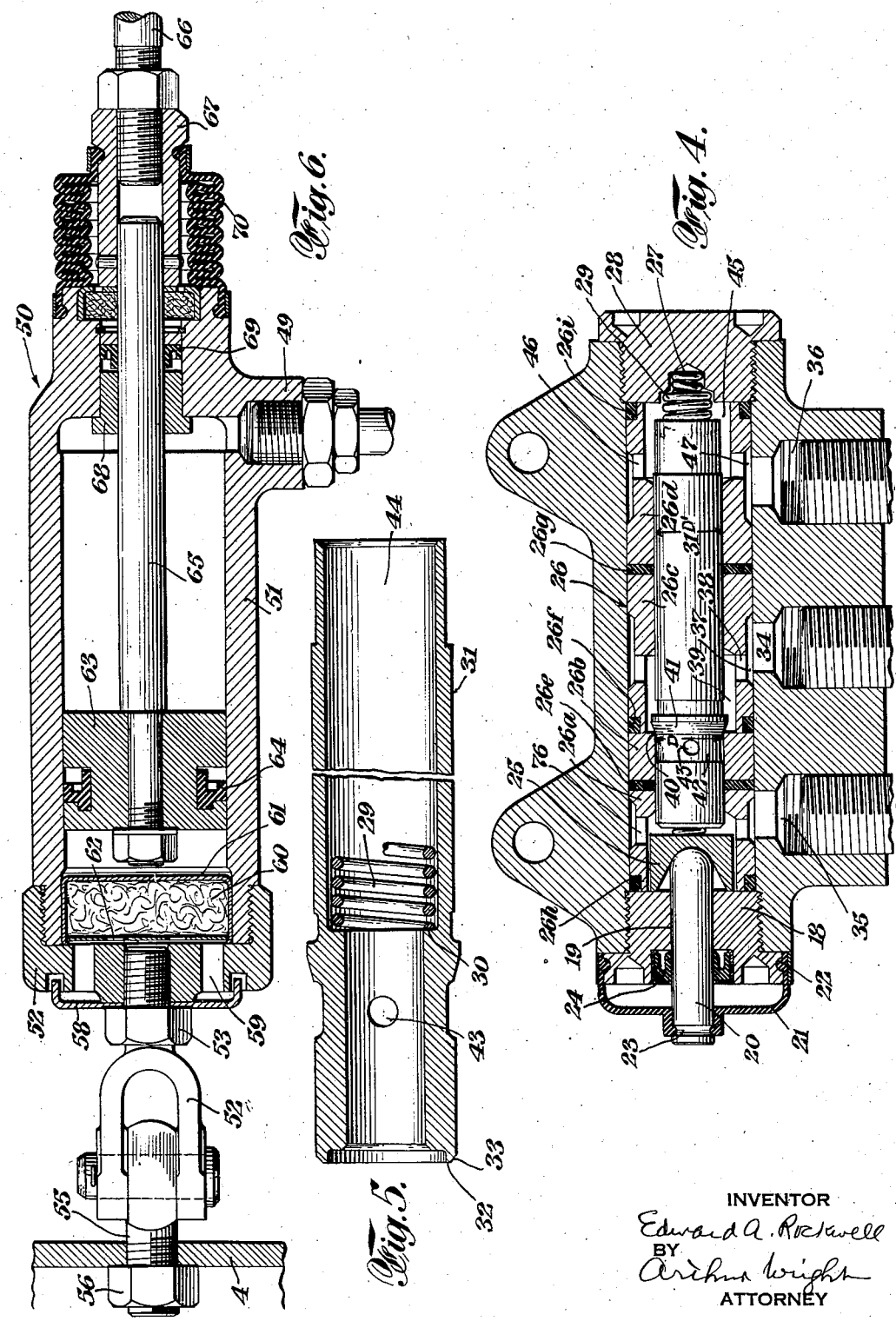

Patented Mar. 17, 1942

2,276,418

UNITED STATES PATENT OFFICE 2,276,418

APPARATUS FOR CONTROLLING THE APPLICATION OF POWER

Edward A. Rockwell, Forest Hills, N. Y.

Application November 19, 1938, Serial No. 241,312

14 Claims. (Cl. 121—46.5)

My invention relates particularly to devices for controlling the application of power for any desired purpose and for power installation of many different kinds but has especial application for controlling the power in connection with the operation of automobile accessories.

The object of my invention is to provide an apparatus of the above character which is adapted to effectively control the application of power wherever desired and particularly in connection with automobile accessories and which, while dependable in action for producing modulated hydraulic pressure, that is to say pressure derived from a hydraulic liquid coordinated to the force applied manually, is capable of being readily installed in various types of automobile construction at a minimum of cost.

The subject matter of this application is an improvement upon the subject matter of previous applications of mine, the later ones of which include my copending application upon Electro flow power supply systems, Ser. No. 28,699, filed June 27, 1935, Patent No. 2,136,638, granted November 15, 1938, and upon my copending divisional application upon Valve and booster system, Ser. No. 234,637, filed October 12, 1938.

Further objects of my invention will appear from the detailed description of the same hereinafter.

While my invention is capable of embodiment in many different forms, for the purpose of illustration I have shown one embodiment thereof in the accompanying drawings, in which—

Fig. 4 is a longitudinal vertical section of the same showing the exterior of the tubular valve therein in elevation;

Fig. 5 is a longitudinal section of the tubular valve therein; and

Fig. 6 is a longitudinal vertical section of the hydraulic actuator used in connection therewith.

Figure 1:
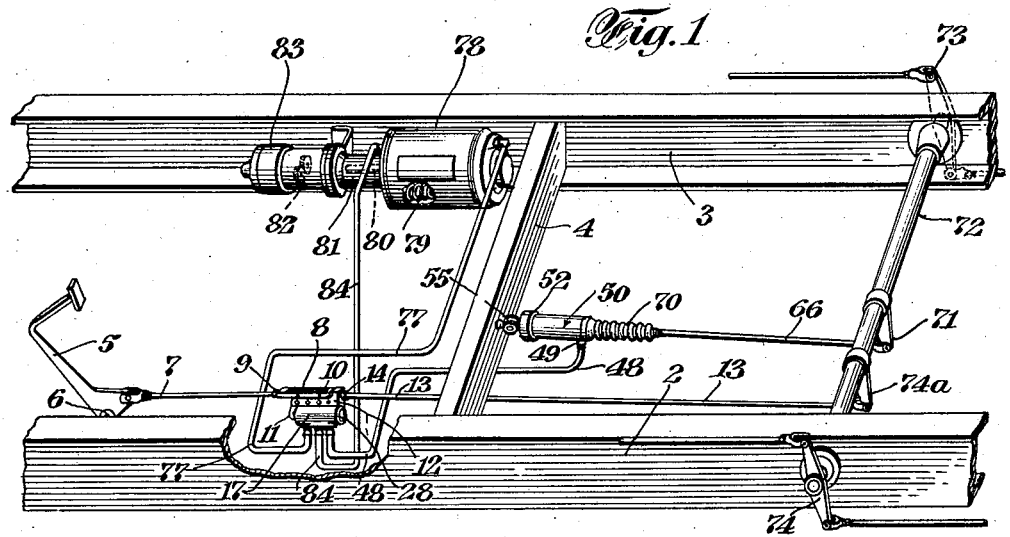
Fig. 1 is a diagrammatic perspective view of my invention shown as applied to the operation of automobile brakes.
Figure 3:
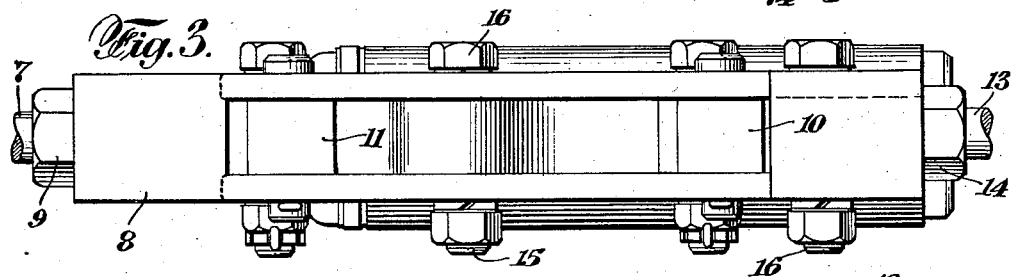
Fig. 3 is a plan view of the same.
Figure 2:
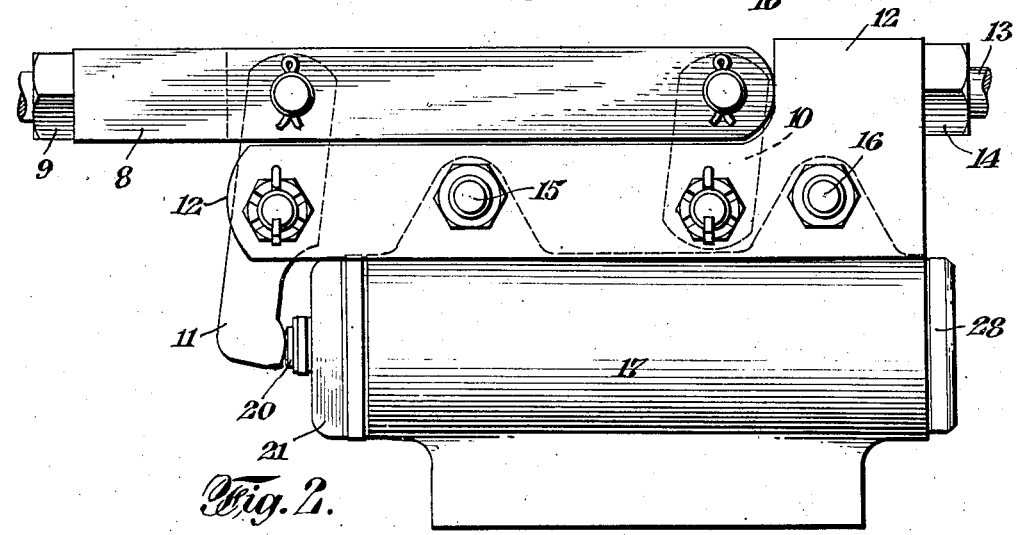
Fig. 2 is an enlarged side elevation of the valve operating unit therein.

In the form of my invention as shown in the accompanying drawings, I have illustrated a frame 1 of an automobile chassis, comprising two longitudinal U-beams 2 and 3 and a transverse U-beam 4. Mounted on the chassis of the automobile, at any desired point accessible to the driver, there is provided a foot-pedal lever 5 carried by a pivot 6 having a valve operating rod 7 pivotally connected to said lever and which, at the other end, is screw-threaded into a valve operating yoke 8, locking screws 9 being provided to secure the rod 7 and yoke 8 together, which is pivotally mounted on a rear link 10 and a front valve operating link and lever 11 which are pivotally carried in a bifurcated bracket 12 which in turn is screw-threaded at its rear end to a brake-operating-rod 13, locking screws 14 being provided to tighten the bracket 12 on the brake-rod 13. The link 10 and lever 11 provide for longitudinal parallel movement of the yoke 8 when operated by the foot-pedal lever 5. The bracket 12 is, furthermore, secured by bolts 15 and 16 to a valve housing 17. At its forward end the valve housing 17 has screw-threaded into the same a cap 18 provided with a central opening 19 to receive a plunger 20 which abuts against the end of the lever 11. A rubber boot 21, to prevent the access of dirt, is received at one end in a recess 22 in the cap 18 and at the other end in a recess 23 in the plunger 20. An annular rubber seal 24, U-shaped in cross section, is also carried in the cap 18 around the plunger 20 to prevent the leakage of low pressure hydraulic fluid from the valve structure. At its rear end the plunger 20 is received in a slidable exhaust valve head 25 carried within a four-piece cylindrical shell 26 having composite parts 26a, 26b, 26c, 26d, separated by rubber seals 26e, 26f, 26g, within the valve housing 17, the composite cylindrical shell 26 having, also, terminal rubber seals 26h, 26i. The slidable head 25 is normally urged in a forward direction by means of a spring 27 which abuts against the same, and after passing through the valve structure is seated within a rear cap 28 screw-threaded in the valve housing 17. Also seated in the rear cap 28 there is a larger and stronger spring 29 which, at its other end, abuts against a shoulder 30 on the interior of a tubular valve member 31 located within the cylindrical shell 26, the said valve 31 having at its forward end a slightly flattened exhaust valve seat 32 adapted to contact, when closed, with the slidable head 25. The edge of this end of the tubular valve 31 is provided with a chamfered portion 33 so that the flattened valve seat will have a diameter which is somewhat less than the diameter of the rear portion of the tubular valve 31 to prevent the hydraulic pressure liquid in the release thereof from pushing the slidable head 25 off said valve seat too readily, but not so small that the pressure liquid requires too great a release of the foot pressure to release the liquid. However, this diameter of the flattened valve seat 32 is not made much smaller than the diameter of the rear end of the tubular valve 31, so as thus to avoid requiring the head 25, and therefore the foot-pedal 5, moving too far back in the decreasing or off modulation control.

The valve housing 17 has a high pressure inlet 34 for hydraulic liquid under any desired pressure, which may be, for example, 1000 lbs. per square inch, and is provided with a low pressure hydraulic liquid outlet 35 and a modulating pressure port 36 for modulated pressure to be supplied for operating the brake or other automobile accessory. The high pressure hydraulic liquid, after entering the port 34, is received in an annular passageway 37 in the exterior of the cylindrical shell 26c and which is connected by a port 38 to an internal annular passageway 39 which extends to the front end of the shell 26c so as to end at an annular valve seat 40 on the rear of the end of the shell 26b, the edge of the said valve seat 40 being slightly smaller in diameter than the diameter of the rear end of the tubular valve 31 so as to insure a positive closing of a peripheral tapered valve 41 against said valve seat 40.

When the brakes have been applied the right end of the tubular valve member 31 is exposed to the fluid as the pressure fluid has been admitted to the brakes and is trapped by the valve mechanism at the right end of the tubular valve member 31, and while the valve 25, 32 is still seated and the valve 41 is about to become seated there is a pressure from the liquid exerted towards the right on the valve seat 40 and at the same time there is a pressure towards the left from the end of the tubular valve member 31. It is for these reasons that the diameter D of the valve seat 40 is made slightly less than the diameter D' of the right end of the tubular valve member 31 to insure effective seating of said tubular valve member.

On the exterior of the tubular valve 31 there is located the tapered valve surface 41 cooperating with said valve seat 40 to thus provide a valve which is normally closed to prevent the entry of the high pressure liquid. When, by the movement of the pedal lever 5, the sliding head 25 is moved to the rear to close the valve against the valve seat 32 and thereafter unseat the valve 41 from the seat 40, the high pressure fluid will then have access through an annular passageway 42 and ports 43 to a longitudinal passageway 44 in the interior of the tubular valve so that the high pressure liquid can then have access to the rear end of the tubular valve 31 and thence to an internal annular passageway 45, radial ports 46 and an external annular passageway 47 in the shell 26d to the modulating pressure port 36. The modulating pressure thus applied through the port 36 passes by means of a flexible rubber tube 48 to a port 49 in a mechanical operating unit 50. This is of any desired construction but may, for example, be comprised of a cylinder 51 having a head 52 secured by a bolt 53 and yoke 54 to a ring 55 mounted on the U-beam 4 of the chassis and to which it is secured by a bolt 56. On the bolt 53 there is a baffle 58 on the exterior of the head so as to provide access of air to the ports 59 in said head, which lead into the cylinder 51 having a horsehair packing 60 carried in an enclosure 61 having air openings 62 so as thus to permit the access of air to the cylinder while separating dust therefrom. In the cylinder 51 there is a piston 63 having a rubber seal 64, said piston 63 being connected by a piston rod 65 to a brake rod 66 by means of a screw-threaded connecting member 67. Around the piston rod 65 there are the usual bushings 68, rubber seal 69 and rubberboot 70, the ends of which are connected, respectively, to the cylinder 51 and the connecting member 67. The brake rod 66 leads to a lever 71 on a brake-shaft 72 which has the usual levers 73 and 74 leading to the front and rear brakes in the usual way, and a lever 74a connected to the brake-rod 13. When, thus, power is applied in the operation of the brakes through the aid of hydraulic pressure liquid by closing the valve 25, 32 and opening the valve 40, 41, the pressure will continue to be applied to the brakes until the pressure exerted at the right end of the tubular valve 31 is sufficient in opposition to the force applied manually to the foot-lever 5 to cause the valve 40, 41 to again become seated due to the slight yielding of the operator's foot according to the "feel" from the pedal. Increased brake action can be obtained similarly by increasing the force from the foot-pedal 5, the hydraulic pressure applied to the brakes being thus modulated to the degree of the force applied by the foot-pedal 5. In the off modulation, or when the force to be applied to the brakes is to be decreased, the releasing of the force from the foot-pedal 5 will cause the unseating of the valve 25, 32 and the seating immediately thereafter so as to accord with force being applied by the foot, and while unseated to release the high pressure liquid from the passageway 44 extending through the tubular valve 31 and the low pressure liquid will thus be discharged through radial ports 75 into an annular passageway 76 in the cylindrical shell 26a and thence into the low pressure discharge port 35. From this point the low pressure liquid is conveyed by a flexible rubber tube 77 to the rear end of an accumulator chamber 78 which acts not only as a storage chamber for the low pressure liquid but also as a container for a series of compressed springs 79 arranged to actuate a plunger 80 located in one end of a high pressure chamber 81 which receives the low pressure liquid from the accumulator chamber 78 after passing through a gear pump 82 which is driven by an electric motor 83 supplied with current in any desired way but which is preferably started and stopped by making and breaking the current according to the position of the plunger 80. The details of the construction of the said accumulator 78, high pressure chamber 81, pump 82, and electric motor 83 and appurtenant parts are contained in full in my said Patent No. 2,136,638 and in my copending application upon Pressure accumulator apparatus, Ser. No. 105,679, filed October 15, 1936. From the high pressure chamber 81 the high pressure liquid is conveyed by a flexible rubber tube 84 to the high pressure port 34 in the valve housing 17.

In the operation of the apparatus, when pressure is applied to the pedal-lever 5, owing to the fact that it is connected to the brake rod 13 through the intermediary of the brake valve 17 manually, pressure can be thus applied for the operation of the brakes. However, in the normal operation of the brakes the depression of the foot-pedal 5 results in the operation of the valves 32, 25 and 40, 41, so as to admit the high pressure hydraulic fluid to the operating unit 50, which results in the application of the front and rear wheel brakes. The pressure thus applied by the hydraulic liquid in the operation of the brakes is a modulated pressure, both in the on and off modulations, that is to say in the increasing and decreasing of the braking effect. That is to say the pressure thus applied is coordinated to the degree of force applied manually through the foot-lever 5. At the same time it will be understood, nevertheless, that this is accomplished by the utilization of only a small amount of the hydraulic liquid as in each actuation of the brakes through the admission of the hydraulic fluid the valve 40, 41 quickly seats after each operation as soon as the pressure from the hydraulic liquid applied to the brake is balanced against the foot pressure of the pedal lever 5 so that very little of the hydraulic liquid escapes in this way to the low pressure port 45. Likewise, it will be understood that as very little liquid is used in the repeated operations of the brake the pump 82 will only be called into action very infrequently by the closing of its circuit due to the movement of the plunger 80 in the high pressure chamber 81. The above construction is such, furthermore, that by mounting the valve casing 17 on the brake rod 13 the apparatus can be readily installed on any type of automobile construction and at the same time provides a convenient and effective means for applying manual pressure to the brakes through the agency of the hydraulic valve apparatus coupling the brake rod to the pedal lever. Furthermore, the valve structure is such as to be very dependable and accurate in operation due particularly to the metal valve seat 41 and valve 40 seating thereon and also because of the effective rubber seals associated with the valve structures. The structure is, furthermore, made more compact and self-contained by reason of the springs within the valve 31 which maintain the valves 25, 32 and 40, 41 in their proper positions for operation. There is a better control, furthermore, due to the relations of the size of the valve 40, 41 to the diameter of the tubular valve 31 which, while effectively keeping the valve 41 seated does not require any undue movement of the foot pedal in the off modulation in unseating the same. The entire construction of the valve installation is such, furthermore, as to be extremely adaptable in view of the flexible tubular connections with the other parts of the apparatus, permitting relative movement of the valve structure and the brake rod with regard to the rest of the hydraulic operating system.

While I have described my invention above in detail I wish it to be understood that many changes may be made therein without departing from the spirit of the same.

I claim:

1. In combination, a manual controlling means, a source of hydraulic liquid under pressure, and a valve structure comprising a tubular slidable valve member having a normally open exhaust valve element and a normally closed inlet valve element for said pressure liquid, both of which are adapted to be controlled by said manual means, and a device adapted to be moved by the pressure liquid delivered from said normally closed valve, said normally closed valve element being in the form of a circular tapered metallic valve element on the slidable valve and having cooperating therewith an annular metallic valve seat located around said slidable valve, the normally open exhaust valve element having cooperating therewith an exhaust valve member so as to close the end of said slidable valve nearest the small end of said taper, said slidable valve having a port through the side thereof and intermediate the inlet and outlet valves for admitting said pressure liquid from said normally closed valve to the interior of said slidable valve so as to give access of the liquid to the other end of the slidable valve.

2. In combination, a manual controlling means, a source of hydraulic liquid under pressure, and a valve structure comprising a tubular slidable valve member having a normally open exhaust valve element and a normally closed inlet valve element for said pressure liquid seating in the direction of the pressure exerted by the supply of the hydraulic pressure liquid on this valve element, both of which are adapted to be controlled by said manual means, and a device adapted to be moved by the pressure liquid delivered from said normally closed valve, said normally closed valve element being in the form of a circular tapered metallic valve element on the slidable valve and having cooperating therewith an annular metallic valve seat located around said slidable valve, the normally open exhaust valve element having cooperating therewith an exhaust valve member so as to close the end of said slidable valve nearest the small end of said taper, said slidable valve having a port through the side thereof and intermediate the inlet and outlet valves for admitting said pressure liquid from said normally closed valve to the interior of said slidable valve so as to give access of the liquid to the other end of the slidable valve, said valve structure comprising a casing having an annular chamber for receiving the pressure liquid in which the tubular valve member reciprocates.

3. In combination, a manual controlling means, a source of hydraulic liquid under pressure, and a valve structure comprising a tubular slidable valve member having a normally open exhaust valve element and a normally closed inlet valve element for said pressure liquid seating in the direction of the pressure exerted by the supply of the hydraulic pressure liquid on this valve element, both of which are adapted to be controlled by said manual means, and a device adapted to be moved by the pressure liquid delivered from said normally closed valve, said normally closed valve element being in the form of a circular tapered metallic valve element on the slidable valve and having cooperating therewith an annular metallic valve seat located around said slidable valve, the normally open exhaust valve element having cooperating therewith an exhaust valve member so as to close the end of said slidable valve nearest the small end of said taper, said slidable valve having a port through the side thereof and intermediate the inlet and outlet valves for admitting said pressure liquid from said normally closed valve to the interior of said slidable valve so as to give access of the liquid to the other end of the slidable valve, said valve structure comprising a casing having an annular chamber for receiving the pressure liquid in which the tubular valve member reciprocates, said valve seat for the tubular valve member being slightly smaller in diameter than the outside diameter of the slidable valve member through which the pressure liquid passes for moving said part.

4. In combination, a manual controlling means, a source of hydraulic liquid under pressure, and a valve structure comprising a tubular slidable valve member having a normally open exhaust valve element, having cooperating therewith a valve seat, and a normally closed inlet valve element seating in the direction of the pressure exerted by the supply of hydraulic pressure liquid thereto having cooperating therewith a valve seat, both of which elements are adapted to be controlled by said manual means, a spring within the tubular valve member for keeping the normally open valve normally open and a spring seating against a shoulder inside the slidable valve member for keeping the normally closed valve normally closed.

5. A valve comprising a slidable valve unit having a passageway, a bored member in which the valve is carried, annular resilient seals for the valve unit, located in the bore, a pressure fluid inlet between said seals extending from the outside of said valve to admit the fluid to said passageway, said valve unit having an annular valve element seating in the direction of the pressure exerted by the supply of pressure fluid thereto and a passageway therein adapted to be brought into communication with the fluid inlet, and a movable member for controlling the position of the valve and the escape of the pressure fluid.

6. A valve structure comprising a tubular valve having an annular valve element intermediate the ends of said valve to control the flow of pressure fluid, an annular valve seat therefor around said tubular valve, a valve seat at one end of the tubular valve, and a movable valve member cooperating with said end valve seat to control the position of the tubular valve, the pressure fluid admitted by the annular valve being adapted to apply fluid pressure to the other end of the tubular valve, the diameter of the annular valve seat being intermediate between the diameter of the end valve seat and the diameter of the other end of the tubular valve, said annular valve being adapted to close in the direction of the pressure exerted by the supply of the pressure liquid thereto.

7. A valve structure comprising a tubular valve having an annular valve element intermediate the ends of said valve to control the flow of pressure fluid, an annular valve seat therefor around said tubular valve, a valve seat at one end of the tubular valve, a movable valve member cooperating with said end valve seat to control the position of the tubular valve, the pressure fluid admitted by the annular valve being adapted to apply fluid pressure to the other end of the tubular valve, the diameter of the annular valve seat being intermediate between the diameter of the end valve seat and the diameter of the other end of the tubular valve, a housing in which the tubular valve is adapted to reciprocate and annular valve seals therein located on opposite sides of said annular valve seat respectively.

8. A modulator valve comprising a spring-pressed tubular movable valve member provided with a peripheral valve, a valve casing therefor having a high pressure liquid inlet and outlet for modulated pressure liquid, a discharge port for low pressure liquid, a valve seat within said casing for said peripheral valve, means to unseat said peripheral valve so as to admit the liquid therefrom to the interior of the tubular valve and close one end of the tubular valve while maintaining communication between the other end of the tubular valve and the modulated pressure outlet, seals positioned beyond both sides of said peripheral valve and means for exerting pressure on the sealing means to tighten said seals against the tubular valve.

9. A modulator valve comprising a spring-pressed tubular movable valve member provided with a peripheral inlet valve, a valve casing therefor having a high-pressure liquid inlet and outlet for modulated pressure liquid supplied to said peripheral valve in the direction of its seating, a discharge port for low pressure liquid, a valve seat within said casing for said peripheral valve, and a spring-retracted means responsive to reaction pressures coordinate to the pressures of the liquid supplied through said outlet to unseat said peripheral valve so as to admit the liquid therefrom to the interior of the tubular valve and close one end of the tubular valve while maintaining communication between the other end of the tubular valve and the modulated pressure outlet.

10. In combination, a manual controlling means, a source of hydraulic liquid under pressure, and a valve structure comprising a casing having an inlet chamber for said hydraulic liquid, a slidable valve member in said casing having an exhaust valve element and a normally closed inlet valve element for said pressure liquid, adapted to be controlled by said manual means, and a device adapted to be moved by the pressure liquid delivered from said normally closed valve, said normally closed valve element being in the form of a circular tapered metallic valve element on the slidable valve and having cooperating therewith an insertable ring in said casing adjacent to said chamber provided with an annular metallic valve seat located around said slidable valve and a seal for the slidable valve member adjacent to said ring.

11. In combination, a manual controlling means, a source of hydraulic liquid under pressure, and a valve structure comprising a casing having an inlet chamber for said hydraulic liquid, a slidable tubular valve member in said casing having an exhaust valve element and a normally closed inlet valve element for said pressure liquid, adapted to be controlled by said manual means, and a device adapted to be moved by the pressure liquid delivered from said normally closed valve, said normally closed valve element being in the form of a circular tapered metallic valve element on the slidable valve and having cooperating therewith an insertable ring in said casing adjacent to said chamber provided with an annular metallic valve seat located around said slidable valve and a seal for the slidable valve member adjacent to said ring.

12. A modulator valve comprising a spring-pressed tubular movable valve member provided with a peripheral valve, a valve casing therefor having a relatively high pressure fluid inlet and an outlet for modulated pressure fluid, a discharge port for lower pressure fluid, a rigid valve seat within said casing for said peripheral valve, seals on the casing located on both sides of the rigid valve seat, and means to unseat said peripheral valve in the direction opposite to the pressure exerted by the supply of higher pressure fluid thereto so as to admit the fluid therefrom to the interior of the tubular valve and maintain closed one end of the tubular valve while maintaining communication between the other end of the tubular valve and the modulated pressure outlet.

13. In combination, a manual controlling means, a source of hydraulic liquid under pressure, and a valve structure comprising a casing having an inlet chamber for said hydraulic liquid, a slidable valve member in said casing having an exhaust valve element and a normally closed inlet valve element for said pressure liquid, adapted to be controlled by said manual means, and a device adapted to be moved by the pressure liquid delivered from said normally closed valve, said normally closed valve element being in the form of an annular projecting valve element on the slidable valve and having cooperating therewith an insertable ring in said casing adjacent to said chamber provided with an annular metallic valve seat located around said slidable valve and a seal for the slidable valve member adjacent to said ring.

14. In combination, a manual controlling means, a source of hydraulic liquid under pressure, and a valve structure comprising a casing having an inlet chamber for said hydraulic liquid, a slidable tubular valve member in said casing having an exhaust valve element and a normally closed inlet valve element for said pressure liquid, adapted to be controlled by said manual means, and a device adapted to be moved by the pressure liquid delivered from said normally closed valve, said normally closed valve element being in the form of an annular projecting valve element on the slidable valve and having cooperating therewith an insertable ring in said casing adjacent to said chamber provided with an annular metallic valve seat located around said slidable valve and a seal for the slidable valve member adjacent to said ring.

EDWARD A. ROCKWELL.